(12) United States Patent
Dillard (10) Patent No.: US 9,558,089 B2
(45) Date of Patent: Jan. 31, 2017

(54) TESTING INSECURE COMPUTING ENVIRONMENTS USING RANDOM DATA SETS GENERATED FROM CHARACTERIZATIONS OF REAL DATA SETS

(71) Applicant: INTUIT INC., Mountain View, CA (US)

(72) Inventor: Colin R. Dillard, Forest City, CA (US)

(73) Assignee: INTUIT INC., Mountain View, CA (US)

(*) Notice: Subject to any disclaimer, the term of this patent is extended or adjusted under 35 U.S.C. 154(b) by 143 days.

(21) Appl. No.: 14/539,250

(22) Filed: Nov. 12, 2014

(65) Prior Publication Data

US 2016/0132415 A1    May 12, 2016

(51) Int. Cl.
G06F 11/263   (2006.01)
G06F 11/36   (2006.01)
G06F 21/57   (2013.01)

(52) U.S. Cl.
CPC ......... *G06F 11/263* (2013.01); *G06F 11/3676* (2013.01); *G06F 21/577* (2013.01)

(58) Field of Classification Search
CPC .............................. G06F 11/263; G06F 11/3676
See application file for complete search history.

(56) References Cited

U.S. PATENT DOCUMENTS

| | | | | |
|---|---|---|---|---|
| 5,729,676 A * | 3/1998 | Inoue | ........................ | G06F 8/20 712/206 |
| 7,085,981 B2 * | 8/2006 | Aggarwal | ........ | G01R 31/31830 706/12 |
| 7,376,235 B2 | 5/2008 | Kuehnel | | |
| 7,861,226 B1 * | 12/2010 | Episkopos | .......... | G06F 11/3676 717/124 |
| 8,805,768 B2 | 8/2014 | B'Far et al. | | |
| 9,329,961 B2 * | 5/2016 | Naveh | ................... | G06F 11/263 |
| 2007/0006046 A1 * | 1/2007 | Overman | ............ | G06F 11/3414 714/38.1 |
| 2012/0041989 A1 | 2/2012 | Banahatti et al. | | |
| 2012/0143813 A1 * | 6/2012 | B'Far | ........................ | G06N 5/02 706/52 |
| 2014/0006459 A1 | 1/2014 | Guo et al. | | |
| 2014/0013290 A1 * | 1/2014 | Lyons, Jr. | ........... | G06F 17/5045 716/106 |

\* cited by examiner

*Primary Examiner* — Yolanda L Wilson
(74) *Attorney, Agent, or Firm* — Patterson + Sheridan, LLP (57) ABSTRACT

The disclosed embodiments provide a system that facilitates testing of an insecure computing environment. During operation, the system obtains a real data set comprising a set of data strings. Next, the system determines a set of frequency distributions associated with the set of data strings. The system then generates a test data set from the real data set, wherein the test data set comprises a set of random data strings that conforms to the set of frequency distributions. Finally, the system tests the insecure computing environment using the test data set.

17 Claims, 7 Drawing Sheets

TESTING INSECURE COMPUTING ENVIRONMENTS USING RANDOM DATA SETS GENERATED FROM CHARACTERIZATIONS OF REAL DATA SETS

BACKGROUND

Related Art

The disclosed embodiments relate to techniques for testing insecure computing environments. More specifically, the disclosed embodiments relate to techniques for testing insecure computing environments using random data sets generated from characterizations of real data sets.

Computing environments such as cloud computing systems and/or distributed data stores are often tested before use in production settings. For example, a development team may test the execution of a software system within a new execution environment before choosing to use the new execution environment as a development, staging, and/or production environment for the software system.

However, new computing environments may not include security controls that allow for testing of the computing environments using real data. For example, a software system may store and manipulate sensitive information such as financial data, medical records, and/or personal data. The performance of the software system may also be tested in a third-party execution environment such as a cloud computing system. However, the third-party execution environment may not provide adequate security measures for preventing unauthorized access to the data. Instead, developers of the software system may generate test data for use in testing the software system in the third-party execution environment.

Moreover, conventional techniques for generating "fake" test data for a software system may be associated with a number of drawbacks. First, randomly generated test data may bear no resemblance to real data used in the software system and thus lack characteristics, variations, and/or errors of the real data that can be used to simulate the real-world processing performed by the software system. Second, manual entry of individual data records as test data for the software system may be tedious, include biases of the users generating the test data, and lack the volume of the real data. Third, generation of test data from predefined characterizations of real data may produce test data with the volume and characteristics of the real data. On the other hand, the test data may be limited to the characterized data types unless additional manual characterization is performed to add new types of data to the test data.

Consequently, testing of software systems in insecure computing environments may be facilitated by mechanisms for streamlining the generation of random test data that conforms to the characteristics of real data used by the software systems.

SUMMARY

Sensitive information is commonly used by software systems to perform tasks for users. For example, a web application may use financial data, tax forms, medical records, contact information, and/or other personal information from a user to perform tasks such as tracking the user's medical history, paying bills, filing taxes, and/or managing a budget. To prevent unauthorized access to sensitive data, computing environments for storing and/or manipulating the data may include a number of controls for securing the data, such as encrypting the data, authenticating users before granting access to the data, and/or monitoring the computing environments for malicious activity.

Because unauthorized access to sensitive data may result in a loss of privacy, personal welfare, economic advantage, and/or security, many types of real data may not be suitable for use with computing environments that lack comprehensive security controls. Such computing environments may include new and/or third-party computing environments that are explored and/or tested for potential future use with software systems. For example, a financial-management application may be deployed in a third-party cloud computing system to test the performance of the financial-management application in the cloud computing system. During testing of the financial-management application, randomly generated test data may be used in lieu of real financial data to prevent a financial data breach in the cloud computing system.

To facilitate testing of a software system in a new and/or insecure computing environment, the software system may be run using a test data set that conforms to a statistical characterization of a real data set. The statistical characterization may include a number of frequency distributions associated with the real data set, such as string lengths and/or character counts. The test data set may be generated to reflect the frequency distributions and/or other statistical attributes of the real data set. In turn, testing of the software system with the test data set may better simulate a production environment for the software system than testing of the software system with a test data set that does not statistically resemble the real data set.

The disclosed embodiments provide a system that facilitates testing of an insecure computing environment. During operation, the system obtains a real data set comprising a set of data strings. Next, the system determines a set of frequency distributions associated with the set of data strings. The system then generates a test data set from the real data set, wherein the test data set comprises a set of random data strings that conforms to the set of frequency distributions. Finally, the system tests the insecure computing environment using the test data set.

In some embodiments, the insecure computing environment is tested using at least one of a data join, a row count, a null count, a mathematical operation, a string operation, and/or a data transformation.

In some embodiments, the system determines the set of frequency distributions associated with the set of data strings by first obtaining one or more block definitions, wherein each of the one or more block definitions identifies a set of possible characters for substrings of the data strings. Next, the system generates a set of block sequences from the set of data strings by applying the one or more block definitions to each data string in the set of data strings to produce a block sequence of one or more blocks, wherein each block in the block sequence contains one or more frequency distributions for a substring of the data string that matches a block definition in the one or more block definitions. The system also includes the block sequence in the set of block sequences. The system then generates a combined block sequence from the set of block sequences by combining a set of blocks from each block position in the set of block sequences to produce a block distribution over the set of blocks in the block position, and including the block distribution in the block position of the combined block sequence.

In some embodiments, the one or more block definitions are obtained in a ranked list, and the block sequence is produced by matching characters in the data string to the one or more block definitions according to an order of the one or more block definitions in the ranked list.

In some embodiments, the one or more block definitions include a default block definition at a bottom of the ranked list, and the default block definition is matched to substrings of the data strings that do not match other block definitions in the ranked list.

In some embodiments, the one or more frequency distributions include a length distribution containing a length count for the substring and a character distribution containing one or more character counts.

In some embodiments, combining the set of blocks from each block position in the set of block sequences to produce the block distribution over the set of blocks includes:
  (i) obtaining the set of blocks from each block position in the set of block sequences;
  (ii) for each block definition matching one or more blocks in the set of blocks, combining the one or more frequency distributions in the one or more blocks into a combined block, wherein the one or more frequency distributions further comprise a total count and a null count; and
  (iii) including the combined block in the block distribution.

In some embodiments, generating the test data set as the set of random data strings that conforms to the set of frequency distributions includes:
  (i) selecting a combined block for each block position in the combined block sequence based on the block distribution in the block position;
  (ii) selecting the length of the substring represented by the combined block based on the length distribution for the combined block;
  (iii) selecting a character sequence for the substring based on the length and the character distribution for the combined block; and
  (iv) concatenating the character sequence with other character sequences for other block positions in the combined block sequence to form a random data string.

In some embodiments, generating the test data set as the set of random data strings that conforms to the set of frequency distributions further includes obtaining a data string from the real data set as a seed for generating the random data string.

In some embodiments, generating the test data set as the set of random data strings that conforms to the set of frequency distributions further includes obtaining a salt for the seed.

In some embodiments, the combined block sequence includes a null block representing a null value.

In some embodiments, the real data set is obtained from a column in a database.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Sensitive information is commonly used by software systems to perform tasks for users. For example, a web application may use financial data, tax forms, medical records, contact information, and/or other personal information from a user to perform tasks such as tracking the user's medical history, paying bills, filing taxes, and/or managing a budget. To prevent unauthorized access to sensitive data, computing environments for storing and/or manipulating the data may include a number of controls for securing the data, such as encrypting the data, authenticating users before granting access to the data, and/or monitoring the computing environments for malicious activity.

Because unauthorized access to sensitive data may result in a loss of privacy, personal welfare, economic advantage, and/or security, many types of real data may not be suitable for use with computing environments that lack comprehensive security controls. Such computing environments may include new and/or third-party computing environments that are explored and/or tested for potential future use with software systems. For example, a financial-management application may be deployed in a third-party cloud computing system to test the performance of the financial-management application in the cloud computing system. During testing of the financial-management application, randomly generated test data may be used in lieu of real financial data to prevent a financial data breach in the cloud computing system.

To facilitate testing of a software system in a new and/or insecure computing environment, the software system may be run using a test data set that conforms to a statistical characterization of a real data set. The statistical characterization may include a number of frequency distributions associated with the real data set, such as string lengths and/or character counts. The test data set may be generated to reflect the frequency distributions and/or other statistical attributes of the real data set. In turn, testing of the software system with the test data set may better simulate a production environment for the software system than testing of the software system with a test data set that does not statistically resemble the real data set.

Figure 1:
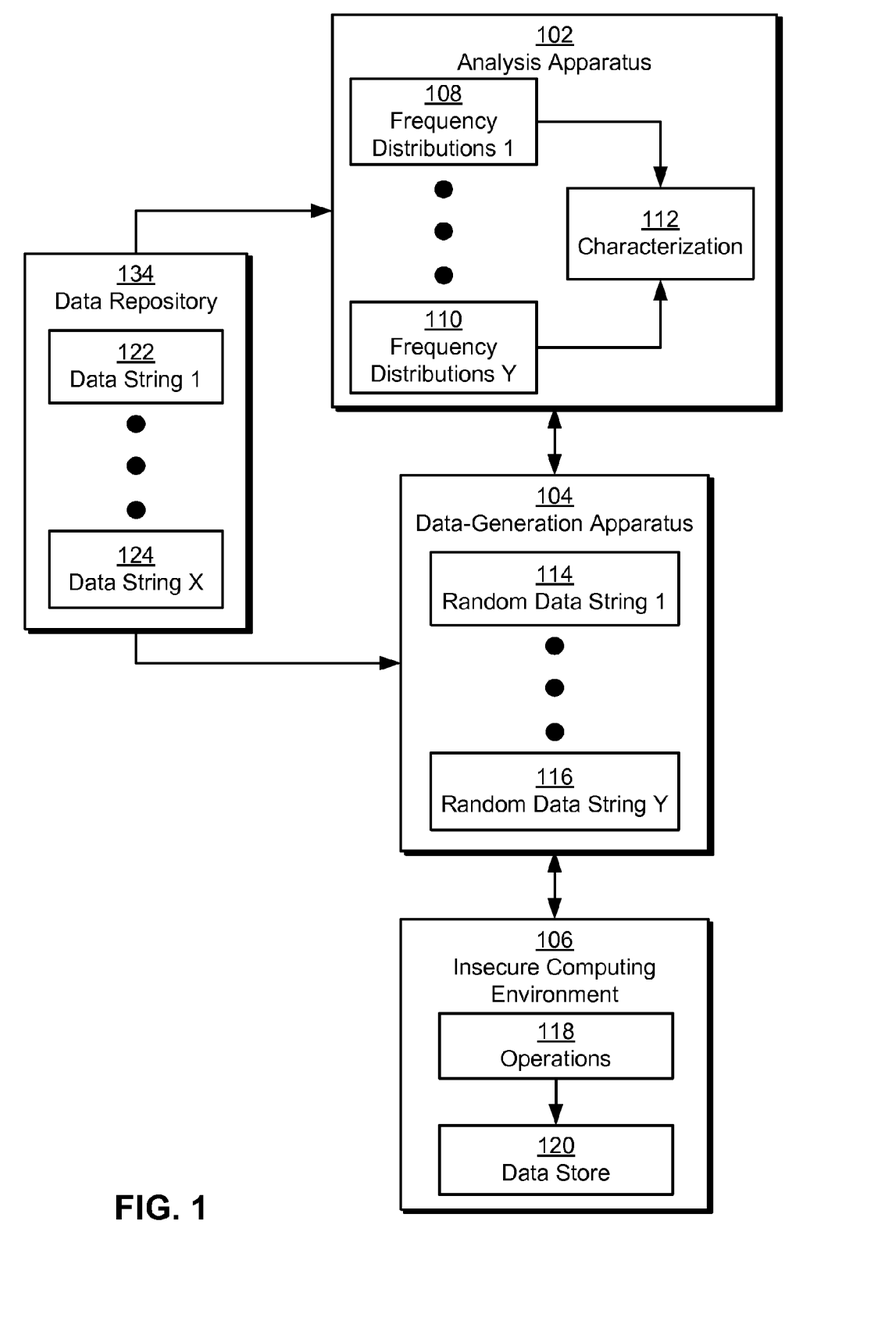
FIG. 1 shows a schematic of a system in accordance with the disclosed embodiments.

FIG. 1 shows a schematic of a system in accordance with the disclosed embodiments. The system of FIG. 1 may be used to facilitate testing of an insecure computing environment 106, such as an execution and/or storage environment that lacks comprehensive security controls.

During testing of insecure computing environment 106, a software system may be deployed to insecure computing environment 106 and executed within insecure computing environment 106. In addition, the software system may be designed to store and/or manipulate certain types of data. For example, the software system may be a financial-management application, tax-preparation application, healthcare-management application, and/or other type of software system that collects, stores, and/or processes financial data, medical records, government records, business information, personal information, and/or other sensitive data. As a result, real data that is used by the software system in a production setting may not be suitable for use in insecure computing environment 106.

As shown in FIG. 1, the system includes an analysis apparatus 102 and a data-generation apparatus 104. Analysis apparatus 102 may generate a characterization 112 of a real data set, and data-generation apparatus 104 may generate a test data set from characterization 112 and/or the real data set. The test data set may then be used to test insecure computing environment 106 in lieu of the real data set. Because the test data set conforms to one or more statistical attributes of the real data set, testing of insecure computing environment 106 with the test data set may better simulate real-world use of a software system that uses the real data set than testing of insecure computing environment 106 with randomly generated test data.

First, analysis apparatus 102 may obtain the real data set as a set of data strings (e.g., data string 1 122, data string x 124) from a data repository 134. Each data string in the real data set may include a sequence of characters, such as alphabetic characters, numeric characters, whitespace characters, special characters, and/or foreign language characters. Data strings in the real data set may also be related to the same attribute and/or property. For example, the data strings may be obtained from a column in a relational database and/or other data repository 134.

Next, analysis apparatus 102 may determine a set of frequency distributions (e.g., frequency distributions 1 108, frequency distributions y 110) from the set of data strings. The frequency distributions may include length distributions containing length counts for the data strings and/or substrings of the data strings. The frequency distributions may also include character distributions containing character counts of characters in the data strings and/or substrings. The frequency distributions may additionally include total counts, null counts, and/or other statistical attributes of the data strings and/or substrings.

Analysis apparatus 102 may then combine the frequency distributions into characterization 112. For example, analysis apparatus 102 may merge the frequency distributions into a sequence of frequency distributions that represents sequences of substrings in the data strings and use the sequence as characterization 112. As a result, characterization 112 may describe a number of statistical properties of data strings in the real data set. Characterization of real data sets is described in further detail below with respect to FIG. 2A.

After characterization 112 is generated, data-generation apparatus 104 may use characterization 112 to generate a test data set containing a set of random data strings (e.g., random data string 1 114, random data string y 116). For example, data-generation apparatus 104 may randomly select character lengths and sequences in the random data strings so that the random data strings conform to the sequence of frequency distributions in characterization 112. As a result, the test data set may include a number of the same statistical properties as those of the real data set. Using characterizations of real data sets to generate test data sets is described in further detail below with respect to FIG. 2B.

The test data set may then be used to test insecure computing environment 106. For example, the test data set may be loaded into a data store 120 in insecure computing environment 106, such as a database, filesystem, in-memory data store, cloud computing system, and/or cloud storage. One or more operations 118 may also be performed on the test data set in data store 120. For example, an application, database management system (DBMS), distributed data-processing system, and/or other software system in insecure computing environment 106 may be used to perform operations 118 such as data joins, row counts, null counts, mathematical operations, string operations, and/or data transformations on the test data set.

Because operations 118 are performed on random data strings that statistically resemble data strings from the real data set, testing of the software system using the test data set may more accurately simulate real-world conditions in which the software system executes than testing of the software system using test data that does not statistically resemble the real data set. Moreover, the system of FIG. 1 may enable the statistical characterization of any type of string-based data, along with the generation of test data sets that conform to the same statistical attributes as the data. Consequently, the system of FIG. 1 may facilitate testing of insecure computing environments with various types of software systems and/or data used by the software systems.

Those skilled in the art will appreciate that the system of FIG. 1 may be implemented in a variety of ways. More specifically, analysis apparatus 102, data-generation apparatus 104, and data repository 134 may execute on the same system or on different systems. For example, analysis apparatus 102 and data-generation apparatus 104 may be provided by the same hardware and/or software component, or analysis apparatus 102 and data-generation apparatus 104 may execute separately from one another. Along the same lines, analysis apparatus 102, data-generation apparatus 104, and data repository 134 may be provided by a single physical machine, multiple computer systems, one or more virtual machines, one or more applications, a grid, one or more databases, one or more filesystems, a batch data-processing system, and/or a cloud computing system.

Figure 2A:
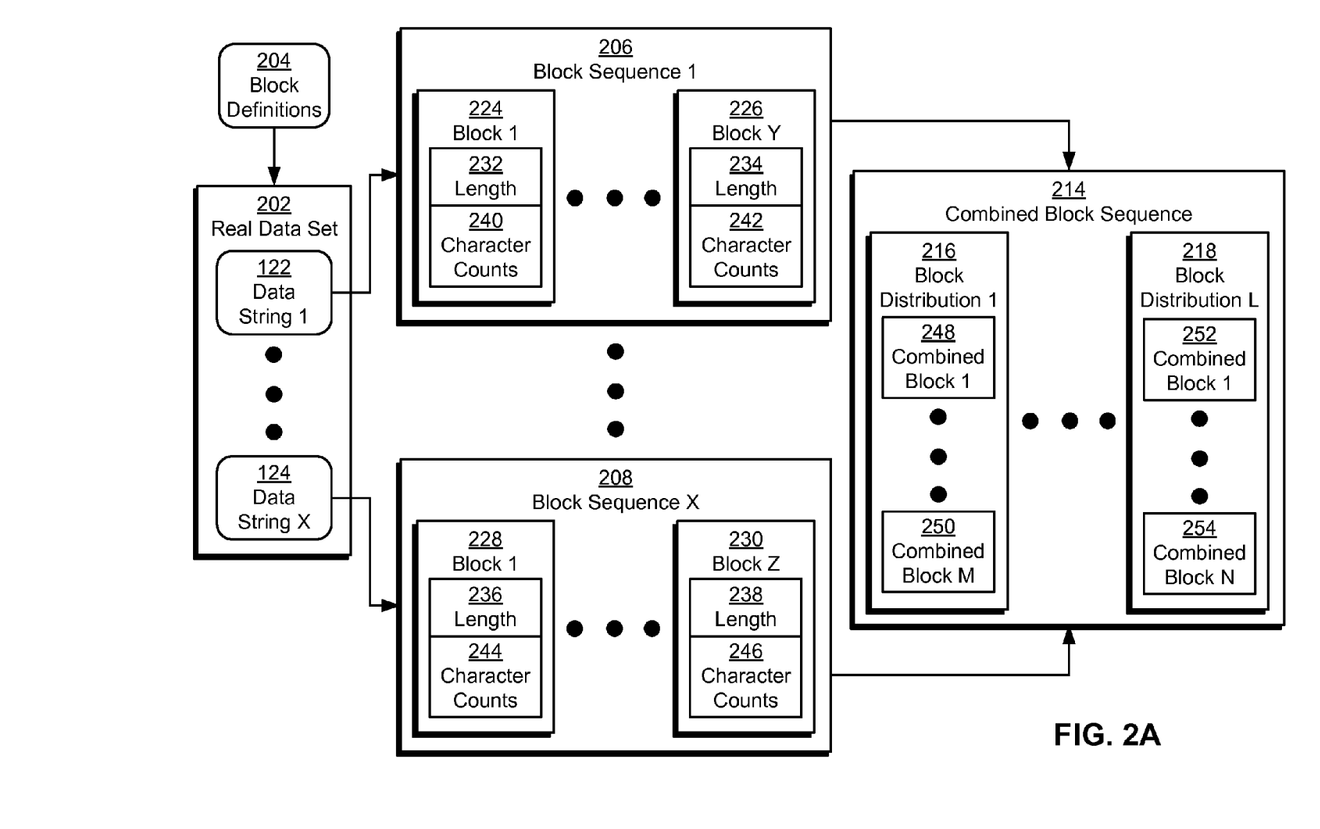
FIG. 2A shows the characterization of a real data set in accordance with the disclosed embodiments.

FIG. 2A shows the characterization of a real data set 202 in accordance with the disclosed embodiments. As described above, real data set 202 may include a set of data strings (e.g., data string 1 122, data string x 124) that are generated, collected, and/or stored during real-world execution of a software system. Each data string may include a sequence of characters that represents a field and/or attribute. For example, real data set 202 may include data strings obtained from the fields of a column in a database.

To characterize real data set 202, one or more block definitions 204 may be applied to each data string in real data set 202 to separate the data string into one or more substrings, progressing from left to right. Each block definition may identify a set of possible characters for substrings of the data strings. For example, a block definition may include one or more alphabetic characters, numeric characters, special characters, foreign language characters, and/or whitespace characters. As a result, block definitions 204 may be used to divide the data strings into substrings that represent distinct subparts of the data strings.

For example, block definitions 204 may include a first block definition that contains alphanumeric characters and the full stop (e.g., ".") character and a second block definition that contains the "@" character. The two block definitions 204 may be used to separate a data string such as an email address (e.g., "j.smith@example.com") into three substrings, with the first substring (e.g., "j.smith") matching the first block definition, the second substring (e.g., "@") matching the second block definition, and the third substring (e.g., "example.com") matching the first block definition. Consequently, the two block definitions 204 may be used to separate the email address into a local part, the @ symbol, and a domain part.

Block definitions 204 may be provided by a user such as a developer associated with the software system. For example, the user may create block definitions 204 as broad categorizations of substrings that are likely to be found in the data strings of real data set 202. Block definitions 204 may additionally be obtained in a ranked list, with higher-ranked block definitions in the ranked list applied before lower-ranked block definitions in the ranked list when a new block is formed by the next character in the data string.

For example, the user may create a ranked list of block definitions 204 that contains a first block definition containing alphabetic characters, followed by a second block definition containing alphanumeric characters. An alphanumeric data string (e.g., "abc123xyz") may be matched to the first block definition to form a first substring (e.g., "abc") until a numeric character is encountered in the data string. The numeric character and subsequent alphanumeric characters may then be matched to the second block definition to form a second substring (e.g., "123xyz") of the data string. Conversely, the ranking of the second block definition higher than the first block definition may produce a single substring containing all of the characters from the data string (e.g., "abc123xyz").

At the bottom of the ranked list, a default block definition may include all characters that are not specified in any of the other block definitions in the ranked list. As a result, substrings of the data strings that do not match any pre-defined block definitions in the ranked list may be matched to the default block definition.

After each data string is separated into one or more substrings by block definitions 204, a block sequence (e.g., block sequence 1 206, block sequence x 208) of one or more blocks (e.g., block 1 224, block y 226, block 1 228, block z 230) is generated from the data string. For example, 500 block sequences may be generated from 500 data strings in real data set 202. Each block in a block sequence may characterize a substring of the data string that matches a block definition. The characterization may include one or more frequency distributions associated with the substring, including a length 232-238 and one or more character counts 240-246.

Continuing with the above example, the "abc123xyz" data string may be separated into the "abc" and "123xyz" substrings by the alphabetic and alphanumeric block definitions 204. The two substrings may then be used to create a block sequence containing two blocks. The first block in the block sequence may have a length (e.g., length 232-238) of three and character counts (e.g., character counts 240-246) of 1 each for the characters "a," "b," and "c." The second block in the block sequence may have a length of six and character counts of 1 each for the characters "1," "2,", "3", "x", "y", and "z."

The block sequences may also include other frequency distributions and/or types of blocks. First, a block sequence may include a null block representing a null value. The null block may be produced from a null data string. For example, a block sequence created from a null data string may have a single null block representing the null data string. Alternatively, one or more null blocks may be placed at the end of a block sequence if the block sequence has fewer blocks than the maximum number of blocks found in any block sequence created from real data set 202. For example, block sequences may be generated from email addresses to include three blocks representing the local parts, @ symbols, and domain parts of the email addresses. A well-formed email address (e.g., "j.smith@example.com") may produce a block sequence with three blocks representing non-null substrings (e.g., "j.smith," "@," and "example.com"), while a malformed email address (e.g., "j.smith@") may produce a block sequence with two blocks representing non-null substrings (e.g., "j.smith" and "@") and a third null block representing the missing domain part of the email address.

Second, each block and/or block sequence may include a null count and a total count. The null count may represent the number of null values in the block and/or block sequence, and the total count may represent the total number of values in the block and/or block sequence. For example, a non-null block may have a null count of 0 and a total count of 1, while a null block may have a null count of 1 and a total count of 1. A block sequence with one or more non-null blocks may have a null count of 0 and a total count of 1, and a block sequence containing only null blocks may have a null count of 1 and a total count of 1.

The block sequences may then be combined into a combined block sequence 214 representing real data set 202. To generate combined block sequence 214, a set of blocks from each block position in the set of block sequences is combined to produce a block distribution (e.g., block distribution 1 216, block distribution 1 218) over the set of blocks in the block position. The block distribution is then included in the block position of the combined block sequence.

More specifically, each block position may represent the position of a substring (e.g., first, second, third, etc.) in the corresponding block sequence, and the set of blocks in the block position may be obtained from all block sequences generated from real data set 202. As a result, the first block position may represent all blocks that appear first in the block sequences, the second block position may encompass all blocks that appear second in the block sequences, and so on.

To produce a block distribution over a set of blocks from a given block position, frequency distributions of one or more blocks in the block position that match the same block definition may be merged into a combined block (e.g., combined block 1 248, combined block m 250, combined block 1 252, combined block n 254), and the combined block may be included in the block distribution. The block distribution may then be placed in the corresponding block position of combined block sequence 214. As a result, combined block sequence 214 may be a sequence of block distributions, with each block distribution representing the distribution of blocks within a given block position in the sequence. The block distribution may include one or more combined blocks, and each combined block may represent the frequency distributions (e.g., length distributions, character distributions, total counts, null counts, etc.) of substrings in the block position that match a given block definition.

For example, real data set 202 may include three data strings: "bob jones," "annie 42," and "al." Block definitions 204 may include, in order of priority, alphabetic characters, space characters, and numeric characters. The data strings and block definitions 204 may be used to produce three block sequences, each containing three blocks. A first block sequence for "bob jones" may have a total count of 1 and a null count of 0. A first block in the first block sequence may match the first block definition (e.g., alphabetic characters) and include a length of 3 and character counts of 2 for "b" and 1 for "o." A second block in the first block sequence may match the second block definition (e.g., space characters) and have a length of 1 and a character count of 1 for the space character. A third block in the first block sequence may match the first block definition (e.g., alphabetic characters) and have a length of 5 and character counts of 1 for each of "j," "o," "n," "e," and "s."

A second block sequence for "annie 42" may have a total count of 1 and a null count of 0. A first block in the second block sequence may match the first block definition (e.g., alphabetic characters) and include a length of 5 and character counts of 2 for "n" and 1 for each of "a," "i," and "e." The second block sequence may also include a second block that matches the second block definition (e.g., space characters); the second block may have a length of 1 and a character count of 1 for the space character. The second block sequence may additionally include a third block that matches the third block definition (e.g., numeric characters); the third block may include a length of 2 and character counts of 1 for each of "4" and "2."

A third block sequence for "al" may include a total count of 1 and a null count of 0. A first block in the third block sequence may match the first block definition (e.g., alphabetic characters) and include a length of 2 and character counts of 1 for "a" and "1." The third block sequence may contain null blocks for the remaining two blocks because only one non-null substring is produced from the third block sequence based on block definitions 204.

To create a combined block sequence (e.g., combined block sequence 214) from the three block sequences, blocks occupying the first block position in the three block sequences are merged to form a single combined block for the block distribution in the first block position. The combined block may represent the first block definition (e.g., alphabetic characters) and have a total count of 3; a length distribution of 1 length count each for lengths of 3, 5, and 2; and a character distribution containing character counts of 2 for "b," 1 for "o," 2 for "a," 2 for "n," 1 for "i," 1 for "e," and 1 for "1." The block distribution may also have a total count of 3 and a null count of 0.

Next, blocks occupying the second block position in the three block sequences are merged into two combined blocks for the block distribution in the second block position. The first combined block may represent the second block definition (e.g., space characters) and have a total count of 2, a length distribution of 2 containing a length count of 1 for a length of 1, and a character distribution containing a single character count of 2 for the space character. The second combined block may be a null block with a total count of 1. The block distribution in the second block distribution may thus have a total count of 3 and a null count of 1.

Blocks occupying the third block position in the three block sequences are then used to create three combined blocks for the block distribution in the third block position. The first combined block may have a total count of 1 and the same frequency distributions as the third block of the first block sequence (e.g., the block characterizing "jones"). The second combined block may have a total count of 1 and the same frequency distributions as the third block of the second block sequence (e.g., the block characterizing "42"). The third combined block may be a null block with a total count of 1 that is obtained from the block sequence of the third substring (e.g., "al"). As a result, the block distribution in the third block position may have a total count of 3 and a null count of 1.

Finally, the total counts and null counts of the three block sequences may be merged into a total count of 3 and a null count of 0 for the combined block sequence. The block distributions containing the combined blocks for the three block sequences may also be placed in the respective block positions in the combined block sequence.

Creation of combined block sequence 214 from a large data set may further be facilitated using a distributed parallel-processing technique such as MapReduce. During the map step, individual data strings in the data sets may be characterized to form block sequences from the data strings. During the reduce step, the block sequences may be combined to form combined block sequence 214. Such parallel-processing steps may also be applied to a continuously updating data stream instead of a fixed data set.

Figure 2B:
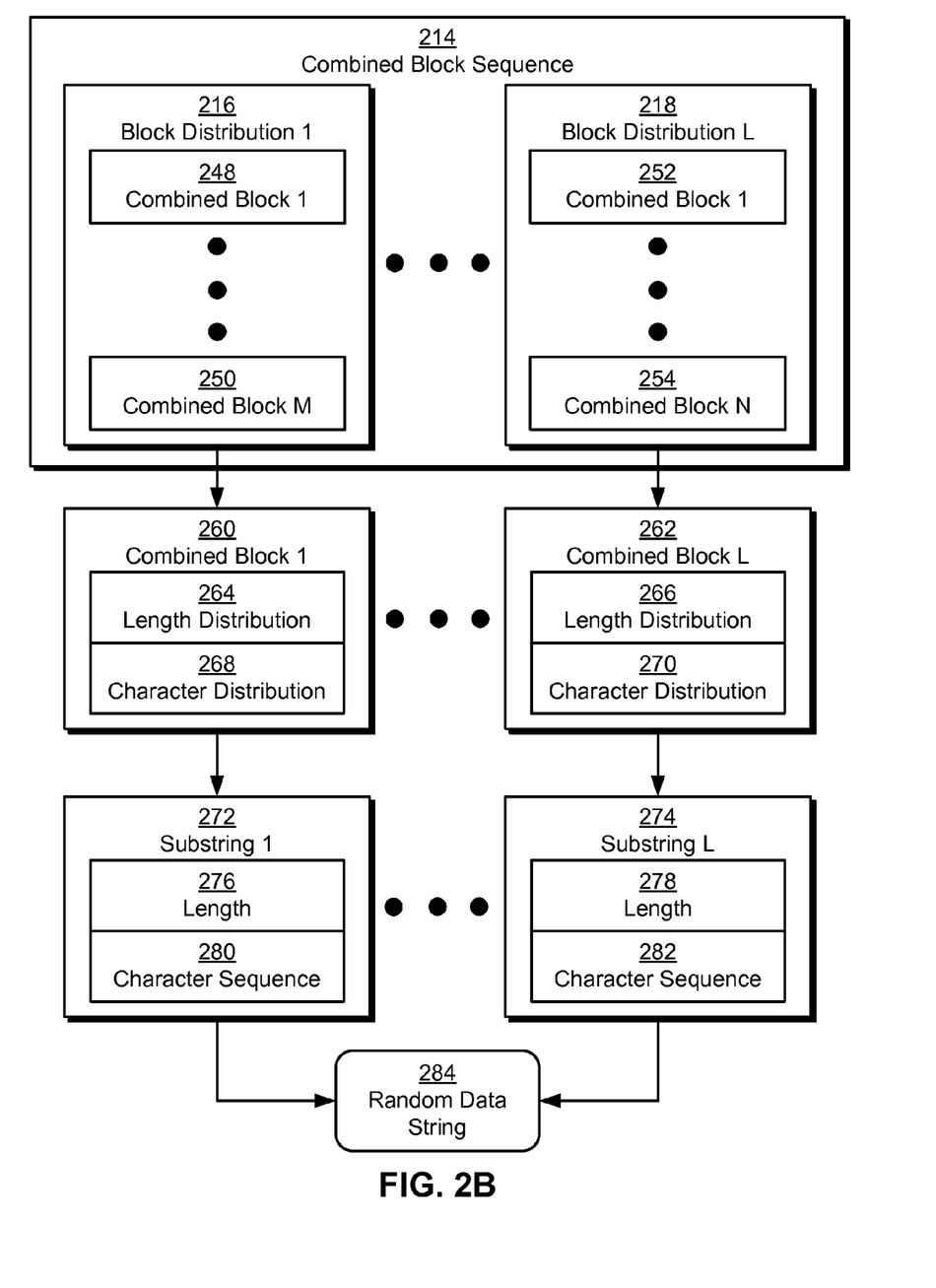
FIG. 2B shows the generation of a test data set from a characterization of a real data set in accordance with the disclosed embodiments.

As a result, combined block sequence 214 may contain a statistical characterization of real data set 202, such as characterization 112 of FIG. 1. Combined block sequence 214 may then be used to generate a test data set containing a set of random data strings that conform to the frequency distributions in combined block sequence 214. As shown in FIG. 2B, a random data string 284 in the test data set may be created by selecting a combined block (e.g., combined block 1 260, combined block 1 262) for each block position in combined block sequence 214 based on the block distribution (e.g., block distribution 1 216, block distribution 1 218) in the block position. Because the combined block is obtained from combined block sequence 214, the combined block may contain a length distribution 264-266 and a character distribution 268-270.

Next, a substring (e.g., substring 1 272, substring 1 274) for each block position is generated from the selected combined block (e.g., combined block 1 260, combined block 1 262) in the block position. To generate the substring, a length 276-278 of the substring is selected based on the length distribution (e.g., length distributions 264-266) for the combined block, and a character sequence 280-282 for the substring is selected based on the selected length and the character distribution (e.g., character distributions 268-270) for the combined block. The character sequence is then concatenated with other character sequences for other block positions in the combined block sequence to form random data string 284.

Continuing with the previous example of "bob jones," "annie 42," and "al," the combined block sequence generated from the three data strings may include three block distributions that are used to generate three substrings. Because the block distribution in the first block position only has one combined block representing alphabetic characters, the first substring is generated from the length and character distributions of the combined block to produce a substring with a length of 3, 5, or 2 and a character sequence that is selected from the characters in "bob," "annie," and "al." On the other hand, the block distribution in the second block position may have two blocks: a combined block representing space characters with a total count of 2 and a null block with a total count of 1. As a result, the block distribution in the second block position may produce a null substring ⅓ of the time and a space character ⅔ of the time. The block distribution in the third block position may have three different combined blocks, each of which may be selected ⅓ of the time. In turn, the combined blocks for the third block position may generate a substring of length 5 and characters that are selected with equal probability from "j," "o," "n," "e," and "s;" a substring of length 2 and characters that are selected with equal probability from "4" and "2;" and a null substring, respectively. The three substrings generated from the three block positions may then be concatenated to produce a random data string such as "aboin 22," "il nsnej," and/or "bal."

In addition, random data string 284 and/or other random data strings in the test data set may be mapped to data strings in real data set 202 by providing the data strings as seeds for generating the random data strings. For example, 50 data strings representing state names may be provided as seeds for generating random data strings from the state names so that each state name consistently maps to the same random data string. Such mappings of real data strings to random data strings may preserve similar mappings of the real data strings in a database and/or other data store. For example, the use of a state name as a seed for generating a random data string from the state name may ensure that the same random data string is generated every time the state name is encountered in a database column.

A salt for the seed may also be used to change the mapping of data strings to random data strings. Continuing with the above example, a salt of "billing" or "mailing" may be appended to the state name to generate a set of fake state names from a first database column containing state names for billing addresses and a different set of fake state names from a second database column containing state names for mailing addresses.

Figure 3:
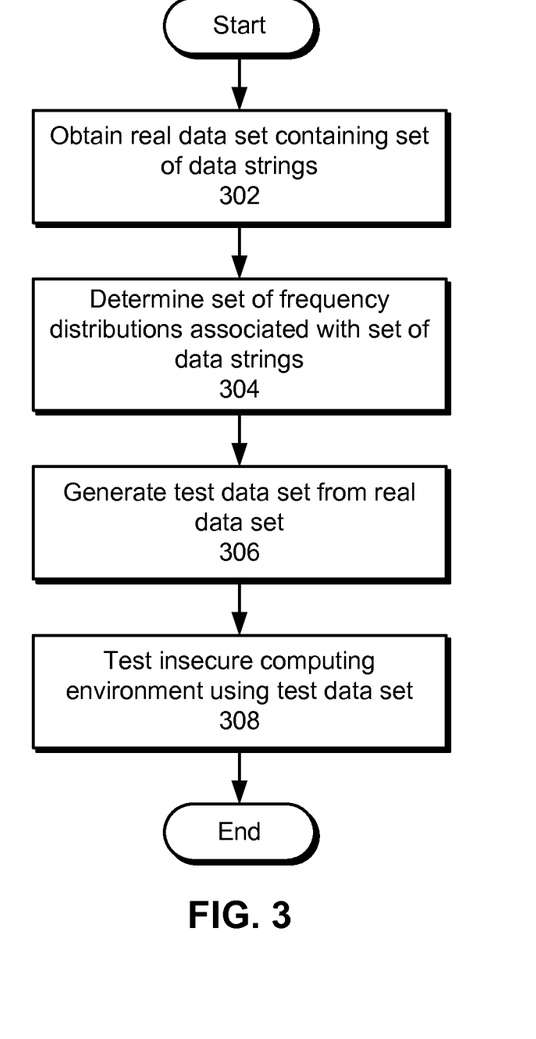
FIG. 3 shows a flowchart illustrating the process of facilitating testing of an insecure computing environment in accordance with the disclosed embodiments.

FIG. 3 shows a flowchart illustrating the process of facilitating testing of an insecure computing environment in accordance with the disclosed embodiments. In one or more embodiments, one or more of the steps may be omitted, repeated, and/or performed in a different order. Accordingly, the specific arrangement of steps shown in FIG. 3 should not be construed as limiting the scope of the technique.

Initially, a real data set containing a set of data strings is obtained (operation 302). The data strings may include sequences of characters such as alphabetic characters, numeric characters, special characters, foreign language characters, and/or whitespace characters. The data strings may also be related to an attribute, property, and/or type of data. For example, the data strings may be obtained from a column of a database.

Next, a set of frequency distributions associated with the set of data strings is determined (operation 304). The frequency distributions may include a length distribution, a character distribution, a total count, and/or a null count. As a result, the frequency distributions may form a statistical characterization of the real data set. Generating statistical characterizations of data sets is described in further detail below with respect to FIG. 4.

A test data set is then generated from the real data set (operation 306). The test data set may include a set of random data strings that conforms to the frequency distributions of the data strings in the real data set. Generation of test data sets from characterizations of real data sets is described in further detail below with respect to FIG. 5.

Finally, the insecure computing environment is tested using the test data set (operation 308). For example, the test data set may be loaded into a data store in the insecure computing environment, and one or more operations may be performed on the test data set within the insecure computing environment. The operations may include, but are not limited to, data joins, row counts, null counts, mathematical operations, string operations, and/or data transformations.

Figure 4:
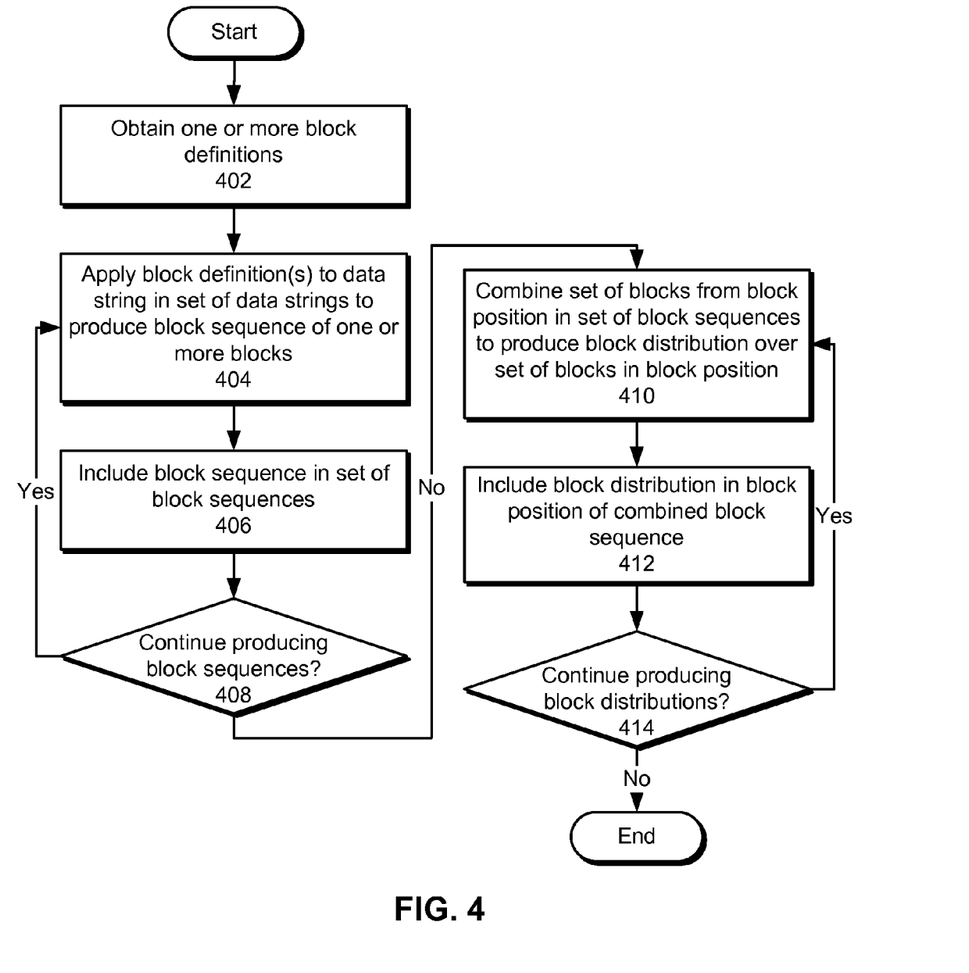
FIG. 4 shows a flowchart illustrating the process of characterizing a real data set containing a set of data strings in accordance with the disclosed embodiments.

FIG. 4 shows a flowchart illustrating the process of characterizing a real data set containing a set of data strings in accordance with the disclosed embodiments. In one or more embodiments, one or more of the steps may be omitted, repeated, and/or performed in a different order. Accordingly, the specific arrangement of steps shown in FIG. 4 should not be construed as limiting the scope of the technique.

First, one or more block definitions are obtained (operation 402). Each block definition may identify a set of possible characters for a substring of a data string. For example, the block definitions may include one or more alphabetic characters, numeric characters, special characters, whitespace characters, foreign language characters, and/or Unicode characters. The block definitions may also be obtained in a ranked list, which includes a default block definition at the bottom of the ranked list that includes all characters not previously included in other block definitions of the ranked list. As a result, all characters in the data strings may be matched to at least one block definition in the ranked list.

Next, the block definition(s) are applied to a data string in the set of data strings to produce a block sequence of one or more blocks (operation 404). For example, characters in the data string, progressing from left to right, may be matched to the block definition(s) according to an order of the block definition(s) in the ranked list. Once a block definition has been matched, subsequent characters are also matched to that block definition if possible. When a character does not match the current block definition, it is instead matched to the first block definition in the ranked list that includes the character. The character and/or adjacent characters that are matched to the same block definition may form a substring that is used to create a block in the block sequence.

Each block in the block sequence may include one or more frequency distributions for the corresponding substring. For example, the block may include a length distribution containing a length count for the substring and a character distribution containing character counts for characters in the substring. The block may also identify the block definition matching the substring. The block is then included in a set of block sequences (operation 406) that are generated from the set of data strings.

Block sequences may continue to be produced (operation 408) from data strings in the real data set. For example, a block sequence may be created from each data string in a column of a database. The block sequences may also be produced in parallel during the map step of a MapReduce procedure. If block sequences are to be produced, the block definition(s) are applied to data strings in the real data set to produce the block sequences (operation 404), and newly created block sequences are added to the set of block sequences (operation 406) for the real data set. Block sequences may thus continue to be produced until block sequences have been created for all data strings in the set.

The block sequences may then be used to generate a combined block sequence. To generate the combined block sequence, a set of blocks from each block position in the set of block sequences is combined to produce a block distribution over the set of blocks in the block position (operation 410). To combine the blocks from a block position in the set of block sequences, frequency distributions in one or more blocks in the block position that match a given block definition are combined into a combined block representing the block definition. For example, the length and character distributions from the blocks may be merged, and a total count and a null count may be added to the combined block.

The combined block is included in the block distribution, and the block distribution is included in the block position of the combined block sequence (operation 412).

Block distributions may continue to be produced (operation 414) for each block position in the set of block sequences until block distributions have been created for all block positions in the set of block sequences. For example, block distributions may be produced from the block sequences in parallel during the reduce step of a MapReduce procedure. During creation of a block distribution, blocks from a given block position are combined to produce the block distribution (operation 410), and the block distribution is added to the corresponding block position of the combined block sequence (operation 412). The combined block sequence may thus represent a statistical characterization of a sequence of substrings in the real data set.

Figure 5:
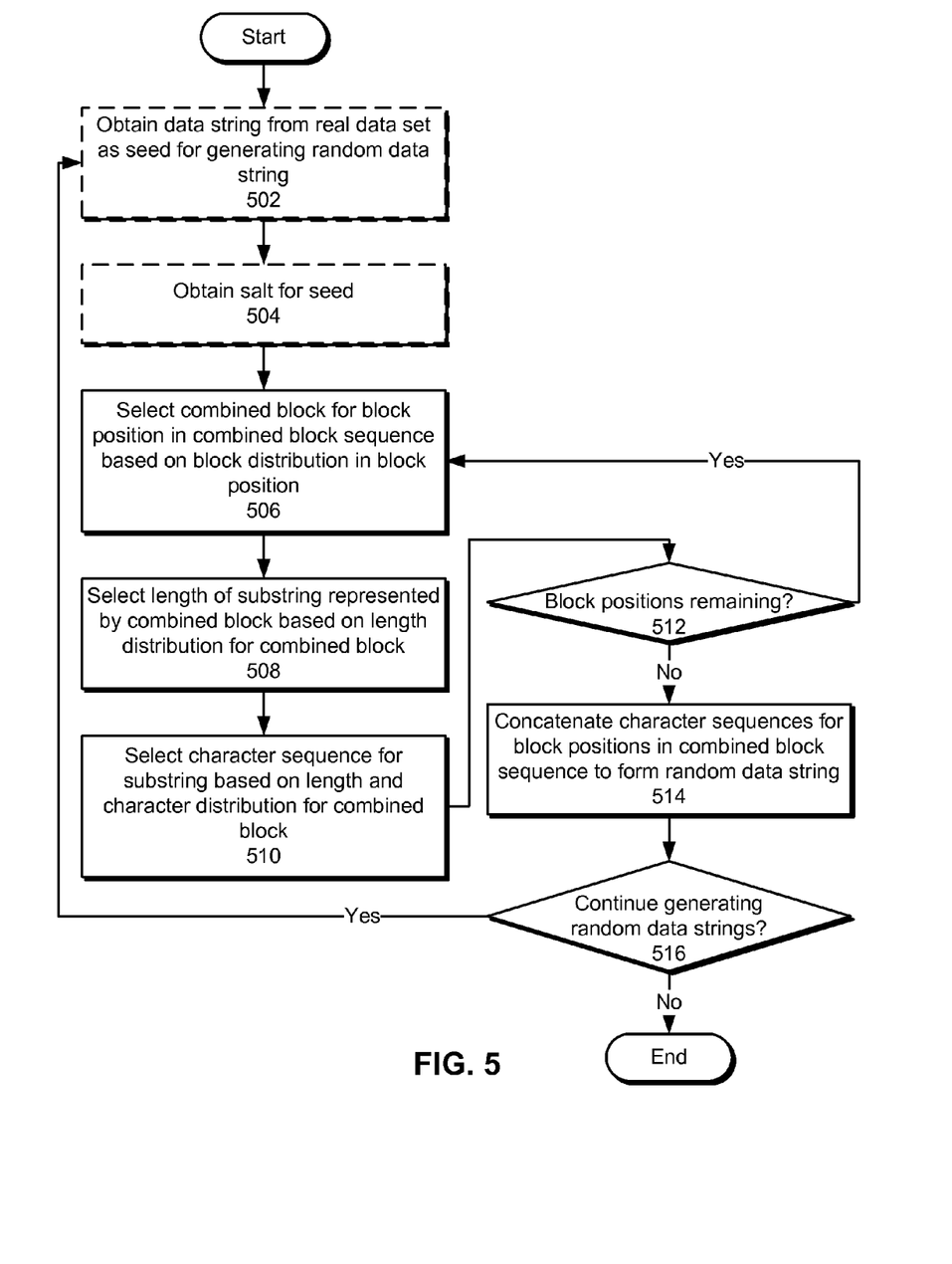
FIG. 5 shows a flowchart illustrating the process of generating a test data set from a characterization of a real data set in accordance with the disclosed embodiments.

FIG. 5 shows a flowchart illustrating the process of generating a test data set from a characterization of a real data set in accordance with the disclosed embodiments. In one or more embodiments, one or more of the steps may be omitted, repeated, and/or performed in a different order. Accordingly, the specific arrangement of steps shown in FIG. 5 should not be construed as limiting the scope of the technique.

First, a data string from the real data set is optionally obtained as a seed for generating a random data string (operation 502), along with a salt for the seed (operation 504). The data string may be used to produce a random data string that consistently maps to the data string, while the salt may be used to vary the mapping across data sets.

Next, a combined block for a block position in a combined block sequence is selected based on a block distribution in the block position (operation 506). As mentioned above, the combined block sequence may include frequency distributions for substring lengths, character counts, total counts, null counts, and/or other statistical attributes of the real data set. As a result, the combined block may be selected based on the total counts and null counts of blocks represented by the combined block in the block position of the combined block sequence. For example, the block position may have a first combined block with a total count of 5, a second combined block with a total count of 2, and a null block with a total count of 3. A random number generator, which may or may not be initialized using a data string and/or a salt as a seed, may generate a number that is used to select the first combined block half of the time, the second combined block 20% of the time, and the null block 30% of the time. If the null block is selected for the first block position in the combined block sequence, the random data string is generated as a null data string without generating substrings for subsequent block positions in the combined block sequence.

After the combined block is selected, a length of a substring represented by the combined block is selected based on the length distribution for the combined block (operation 508). A character sequence for the substring is then selected based on the length and the character distribution for the combined block (operation 510). As with selection of the combined block, the length and character sequence may be selected randomly (e.g., using a random number generator with or without a seed) according to the frequencies in the length and character distributions, respectively.

Substrings may also be generated for remaining block positions (operation 512) in the combined block sequence. As with generation of the combined block sequence from a data set, substrings may be generated in parallel from the combined block sequence. If additional substrings are to be generated, a combined block is selected for the corresponding block position based on the block distribution in the block position (operation 506), and a length and character sequence for the substring are selected based on the frequency distributions in the combined block (operations 508-510). Character sequences generated for all block positions in the combined block sequence may then be concatenated to form a random data string (operation 514).

Random data strings may continue to be generated (operation 516) from the combined block sequence. For example, random data strings may be generated to populate the test data set with enough data to approximate the volume of the real data set. If random data strings are to be generated, a data string and salt are optionally obtained and used as a seed for generating each random data string (operation 504), and the random data string is generated from selected combined blocks, lengths, and character sequences for substrings represented by block positions in the combined block sequence (operations 506-514). Generation of random data strings may continue until creation of the test data set is complete.

Figure 6:
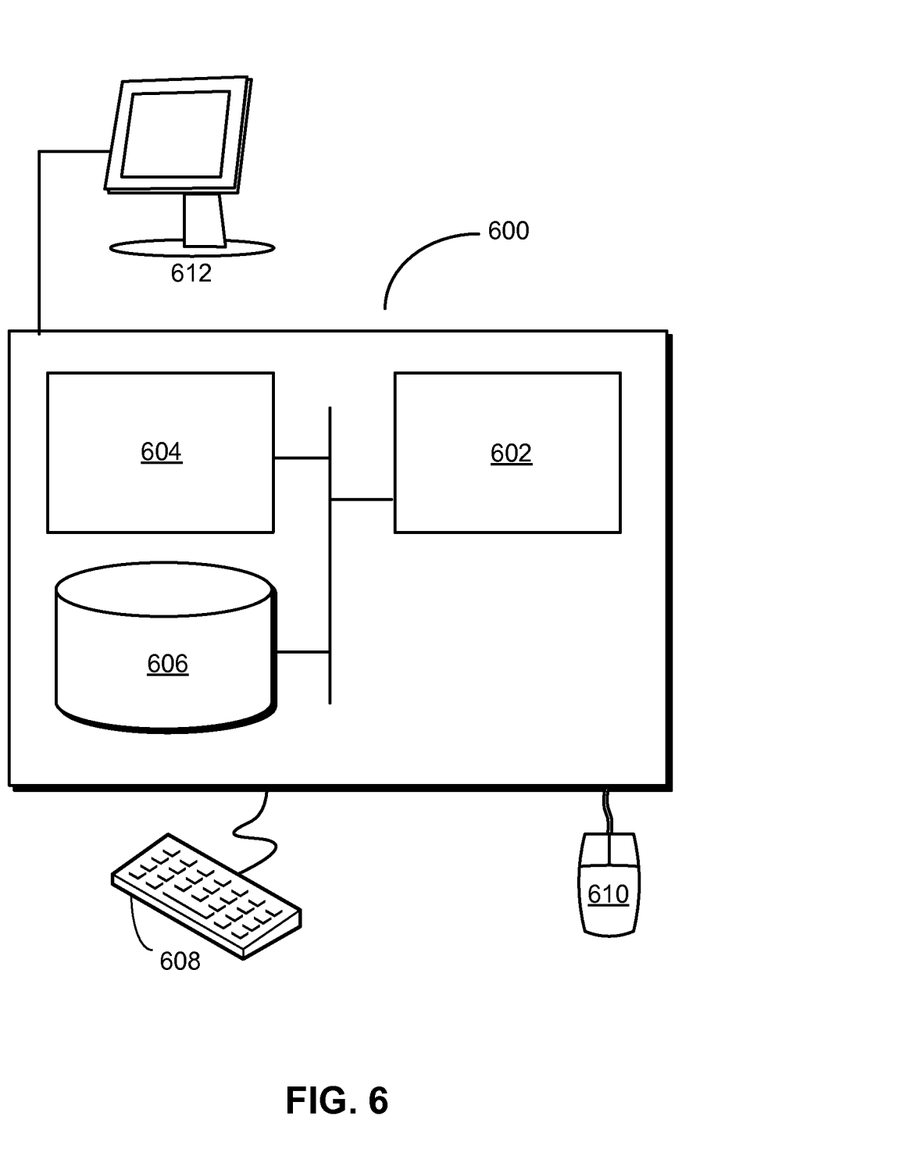
FIG. 6 shows a computer system in accordance with the disclosed embodiments.

FIG. 6 shows a computer system 600 in accordance with an embodiment. Computer system 600 includes a processor 602, memory 604, storage 606, and/or other components found in electronic computing devices. Processor 602 may support parallel processing and/or multi-threaded operation with other processors in computer system 600. Computer system 600 may also include input/output (I/O) devices such as a keyboard 608, a mouse 610, and a display 612.

Computer system 600 may include functionality to execute various components of the present embodiments. In particular, computer system 600 may include an operating system (not shown) that coordinates the use of hardware and software resources on computer system 600, as well as one or more applications that perform specialized tasks for the user. To perform tasks for the user, applications may obtain the use of hardware resources on computer system 600 from the operating system, as well as interact with the user through a hardware and/or software framework provided by the operating system.

In one or more embodiments, computer system 600 provides a system for facilitating testing of an insecure computing environment. The system may include an analysis apparatus that obtains a real data set containing a set of data strings and determines a set of frequency distributions associated with the set of data strings. The system may also include a data-generation apparatus that generates a test data set from the real data set so that the test data set contains a set of random data strings that conforms to the set of frequency distributions. The system may then test the insecure computing environment using the test data set.

In addition, one or more components of computer system 600 may be remotely located and connected to the other components over a network. Portions of the present embodiments (e.g., analysis apparatus, data-generation apparatus, insecure computing environment, etc.) may also be located on different nodes of a distributed system that implements the embodiments. For example, the present embodiments may be implemented using a cloud computing system that generates random test data sets from characterizations of real data sets for use in testing remote insecure computing environments.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method for facilitating testing of an insecure computing environment, comprising:
   obtaining a real data set comprising a set of data strings;
   determining, by one or more computer systems, a set of frequency distributions associated with the set of data strings, wherein determining the set of frequency distributions associated with the set of data strings comprises:
      obtaining one or more block definitions, wherein each of the one or more block definitions identifies a set of possible characters for substrings of the data strings,
      generating a set of block sequences from the set of data strings by:
         applying the one or more block definitions to each data string in the set of data strings to produce a block sequence of one or more blocks, wherein each block in the block sequence comprises one or more frequency distributions for a substring of the data string that matches a block definition in the one or more block definitions; and
         including the block sequence in the set of block sequences, and
      generating a combined block sequence from the set of block sequences by:
         combining a set of blocks from each block position in the set of block sequences to produce a block distribution over the set of blocks in the block position; and
         including the block distribution in the block position of the combined block sequence;
   generating, by the one or more computer systems, a test data set from the real data set, wherein the test data set comprises a set of random data strings that conforms to the set of frequency distributions; and
   testing the insecure computing environment using the test data set.

2. The method of claim 1, wherein the insecure computing environment is tested using at least one of:
   a data join;
   a row count;
   a null count;
   a mathematical operation;
   a string operation; and
   a data transformation.

3. The method of claim 1,
   wherein the one or more block definitions are obtained in a ranked list, and
   wherein the block sequence is produced by matching characters in the data string to the one or more block definitions according to an order of the one or more block definitions in the ranked list.

4. The method of claim 3,
   wherein the one or more block definitions comprise a default block definition at a bottom of the ranked list, and
   wherein the default block definition is matched to substrings of the data strings that do not match other block definitions in the ranked list.

5. The method of claim 1, wherein the one or more frequency distributions comprise:
   a length distribution comprising a length count for the substring; and
   a character distribution comprising one or more character counts.

6. The method of claim 5, wherein combining the set of blocks from each block position in the set of block sequences to produce the block distribution over the set of blocks comprises:
   for each block definition matching one or more blocks from the block position, combining the one or more frequency distributions in the one or more blocks into a combined block, wherein the one or more frequency distributions further comprise a total count and a null count; and
   including the combined block in the block distribution.

7. The method of claim 6, wherein generating the test data set as the set of random data strings that conforms to the set of frequency distributions comprises:
   selecting a combined block for each block position in the combined block sequence based on the block distribution in the block position;
   selecting the length of the substring represented by the combined block based on the length distribution for the combined block;
   selecting a character sequence for the substring based on the length and the character distribution for the combined block; and
   concatenating the character sequence with other character sequences for other block positions in the combined block sequence to form a random data string.

8. The method of claim 7, wherein generating the test data set as the set of random data strings that conforms to the set of frequency distributions further comprises:
   obtaining a data string from the real data set as a seed for generating the random data string.

9. The method of claim 8, wherein generating the test data set as the set of random data strings that conforms to the set of frequency distributions further comprises:
   obtaining a salt for the seed.

10. The method of claim 1, wherein the combined block sequence comprises a null block representing a null value.

11. The method of claim 1, wherein the real data set is obtained from a column in a database.

12. An apparatus, comprising:
one or more processors; and
memory storing instructions that, when executed by the one or more processors, cause the apparatus to:
obtain a real data set comprising a set of data strings;
determine a set of frequency distributions associated with the set of data strings, wherein determining the set of frequency distributions associated with the set of data strings comprises:
obtaining one or more block definitions, wherein each of the one or more block definitions identifies a set of possible characters for substrings of the data strings,
generating a set of block sequences from the set of data strings by:
applying the one or more block definitions to each data string in the set of data strings to produce a block sequence of one or more blocks, wherein each block in the block sequence comprises one or more frequency distributions for a substring of the data string that matches a block definition in the one or more block definitions; and
including the block sequence in the set of block sequences, and
generating a combined block sequence from the set of block sequences by:
combining a set of blocks from each block position in the set of block sequences to produce a block distribution over the set of blocks in the block position; and
including the block distribution in the block position of the combined block sequence;
generate a test data set from the real data set, wherein the test data set comprises a set of random data strings that conforms to the set of frequency distributions; and
test the insecure computing environment using the test data set.

13. The apparatus of claim 12, wherein the one or more frequency distributions comprise:
a length distribution comprising a length count for the substring; and
a character distribution comprising one or more character counts.

14. The apparatus of claim 13, wherein combining the set of blocks from each block position in the set of block sequences to produce the block distribution over the set of blocks comprises:
for each block definition matching one or more blocks from the block position, combining the one or more frequency distributions in the one or more blocks into a combined block, wherein the one or more frequency distributions further comprise a total count and a null count; and
including the combined block in the block distribution.

15. The apparatus of claim 14, wherein generating the test data set as the set of random data strings that conforms to the set of frequency distributions comprises:

selecting a combined block for each block position in the combined block sequence based on the block distribution in the block position;
selecting the length of the substring represented by the combined block based on the length distribution for the combined block;
selecting a character sequence for the substring based on the length and the character distribution for the combined block; and
concatenating the character sequence with other character sequences for other block positions in the combined block sequence to form a random data string.

16. The apparatus of claim 15, wherein generating the test data set as the set of random data strings that conforms to the set of frequency distributions further comprises:
using a data string in the set of data strings as a seed for generating the random data string.

17. A non-transitory computer-readable storage medium storing instructions that when executed by a computer cause the computer to perform a method for facilitating testing of an insecure computing environment, comprising:
obtaining a real data set comprising a set of data strings;
determining, by one or more computer systems, a set of frequency distributions associated with the set of data strings, wherein determining the set of frequency distributions associated with the set of data strings comprises:
obtaining one or more block definitions, wherein each of the one or more block definitions identifies a set of possible characters for substrings of the data strings,
generating a set of block sequences from the set of data strings by:
applying the one or more block definitions to each data string in the set of data strings to produce a block sequence of one or more blocks, wherein each block in the block sequence comprises one or more frequency distributions for a substring of the data string that matches a block definition in the one or more block definitions; and
including the block sequence in the set of block sequences, and
generating a combined block sequence from the set of block sequences by:
combining a set of blocks from each block position in the set of block sequences to produce a block distribution over the set of blocks in the block position; and
including the block distribution in the block position of the combined block sequence;
generating, by the one or more computer systems, a test data set from the real data set, wherein the test data set comprises a set of random data strings that conforms to the set of frequency distributions; and
testing the insecure computing environment using the test data set.

* * * * *